Dec. 3, 1957 P. A. MAXIMOFF 2,814,802

APPARATUS FOR DISPENSING AND MOUNTING TERMINAL PINS

Filed July 29, 1955 4 Sheets-Sheet 1

INVENTOR.
Paul A. Maximoff,
BY Wilkinson, Huxley, Byron & Hume
attys.

APPARATUS FOR DISPENSING AND MOUNTING TERMINAL PINS

Filed July 29, 1955 4 Sheets-Sheet 2

INVENTOR.
Paul A. Maximoff,
BY Wilkinson, Huxley,
Byron & Hume
Attys.

Dec. 3, 1957 P. A. MAXIMOFF 2,814,802

APPARATUS FOR DISPENSING AND MOUNTING TERMINAL PINS

Filed July 29, 1955 4 Sheets-Sheet 3

INVENTOR.
Paul A. Maximoff,
BY Wilkinson, Huxley, Byron & Hume
attys.

APPARATUS FOR DISPENSING AND MOUNTING TERMINAL PINS
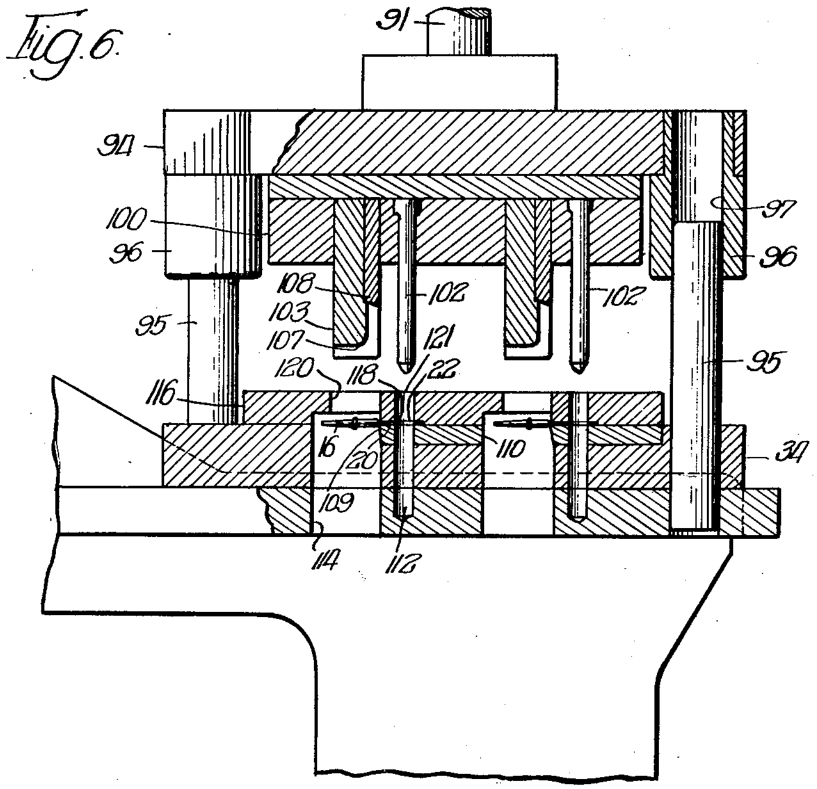
Fig. 7
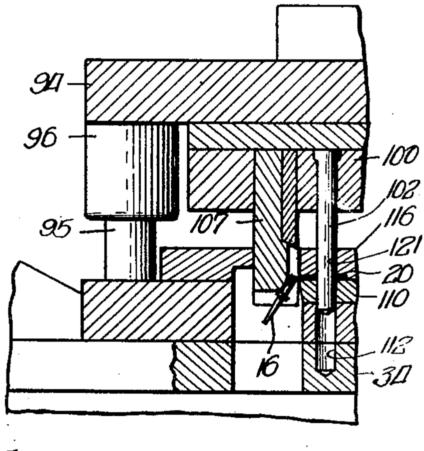
Fig. 8
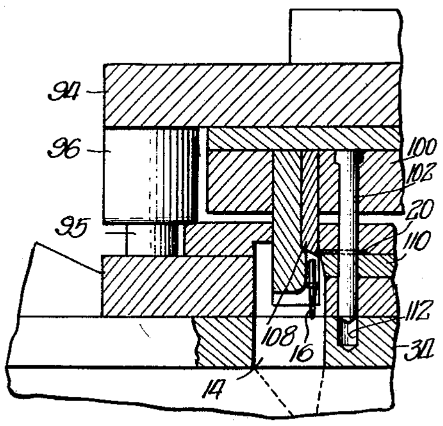
Fig. 9
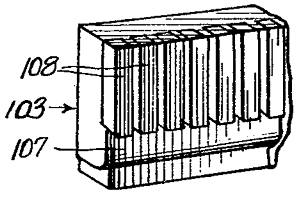
INVENTOR.
Paul A. Maximoff,
BY Wilkinson, Huxley, Byron & Hume United States Patent Office 2,814,802
Patented Dec. 3, 1957

2,814,802

APPARATUS FOR DISPENSING AND MOUNTING TERMINAL PINS

Paul A. Maximoff, Chicago, Ill., assignor to Malco Tool & Mfg. Co., Chicago, Ill., a partnership Application July 29, 1955, Serial No. 525,144

13 Claims. (Cl. 1—2)

This invention relates, as indicated, to a machine for dispensing and mounting terminal pins or the like, and more particularly to a machine for automatically dispensing terminal pins in a preselected pattern, in the base board of a printed circuit element.

In the past, terminal pins have been inserted manually into the base boards of printed circuits. Inasmuch as printed circuit boards normally contain many holes, and the terminal pins are only mounted in certain of these holes in a predetermined pattern or arrangement, the manual placing of terminal pins has been tedious, slow and expensive.

It is, therefore, an object of this invention to provide a machine for automatically dispensing and mounting terminal pins in the base board of a printed circuit.

It is a further object of the invention to provide an apparatus for mounting terminal pins in the base board of a printed circuit at a rate faster than was heretofore possible by manual operation.

Still another object is to provide an apparatus of the character described, which can dispense terminal pins from a continuous flexible strip or ribbon of preformed pins automatically, in a predetermined pattern or arrangement.

Another object is to provide such an apparatus which can dispense a preselected number of pins in each operation and in which the pattern of distribution of the pins can be readily changed at will.

Further objects and advantages of this invention will become evident as the description proceeds and from an examination of the accompanying drawings which illustrate one embodiment of the invention and in which similar numerals refer to similar parts throughout the several views.

In the drawings:

Figure 6 is a fragmentary end view of the punch and die, showing the terminal pin flexible strips in the dispensing position.

Figure 7 is a fragmentary end view of a portion of the punch and die shown in Figure 6, illustrating the bending operation of the punch.

Figure 8 is also a fragmentary end view of a portion of the punch and die shown in Figure 6, illustrating the manner in which the punch severs a terminal pin from a flexible strip of terminal pins.

Figure 9 is a perspective view of one form of punch which may be used in a device embodying this invention.

Figures 2, 3, 10, 11:
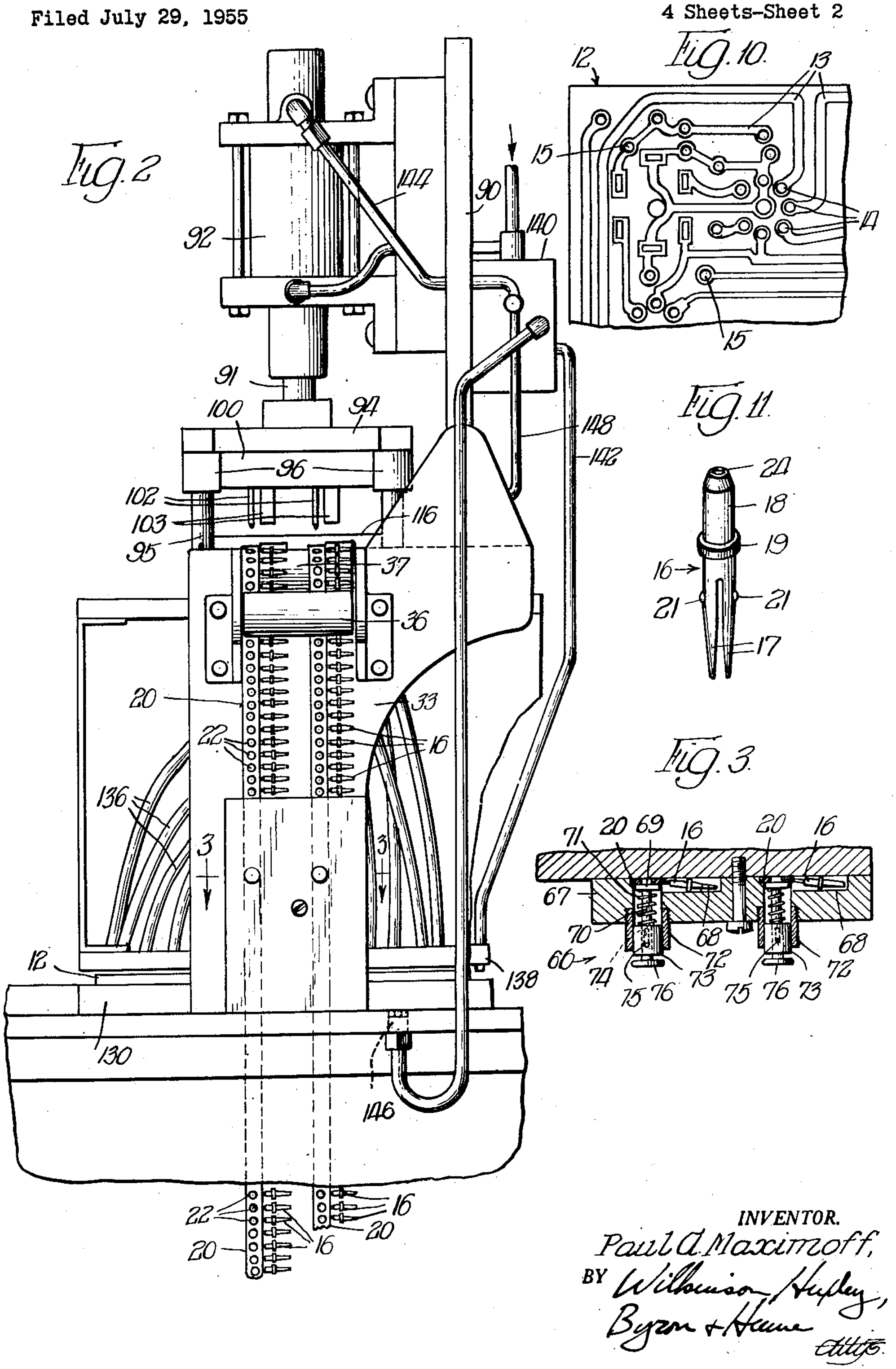
Figure 2 is an end elevational view of the device shown in Figure 1.
Figure 3 is a view in section, taken substantially along line 3—3 of Figure 2.
Figure 10 is a plan view of a portion of a printed circuit board of the type which may be used with apparatus incorporating the invention.
Figure 11 is an enlarged view of a form of terminal pin which may be mounted in the printed circuit board of Figure 10 by the use of apparatus incoroporating the invention.

Referring first to Figure 10 of the drawing, there is illustrated therein a base board 12 containing a typical printed circuit of the type which may be used with apparatus incorporating the present invention. The board 12 has a pattern of electrically conductive material 13 on one surface thereof and a plurality of holes for mounting electrical elements in electrical contact with this material 13. For example, holes 14 are provided for mounting an electronic tube and holes 15 may be used for mounting terminal pins to which may be fastened wiring leads.

One form these terminal pins may take is shown in Figure 11. The pin 16 has a tapered nose 17 and a body 18 and may be mounted in holes 15 of the base board so that the body 18 projects upwardly therefrom. The terminal pin preferably has a longitudinal bore 24 for receiving and attaching a wiring lead, and the bead 19 and the bosses 21 may be additionally provided to aid in properly seating the pin in the board. The particular terminal pin illustrated is described in detail in patent application, Serial No. 499,615, filed April 6, 1955, by Ronald Narozny and owned by the same assignee as the instant application.

As shown in Figure 2, the terminal pins 16 may be integrally formed from a ribbon of metal so that they are carried by a continuous flexible strip or flexible perforated belt 20. The pins project laterally from one edge of the flexible strip, the pin patterns being initially punched from one side of the ribbon of metal and rolled to the desired shape, leaving an integral connection with the perforated base strip or chain 20. The flexible strip may be conveniently stored on reels (not shown) which may be mounted so as to unwind as the flexible strip is fed to the machine. A series of holes 22 may be provided in the flexible strip for advancing the flexible strip and aligning the pins, as is more fully explained below.

Figure 1:
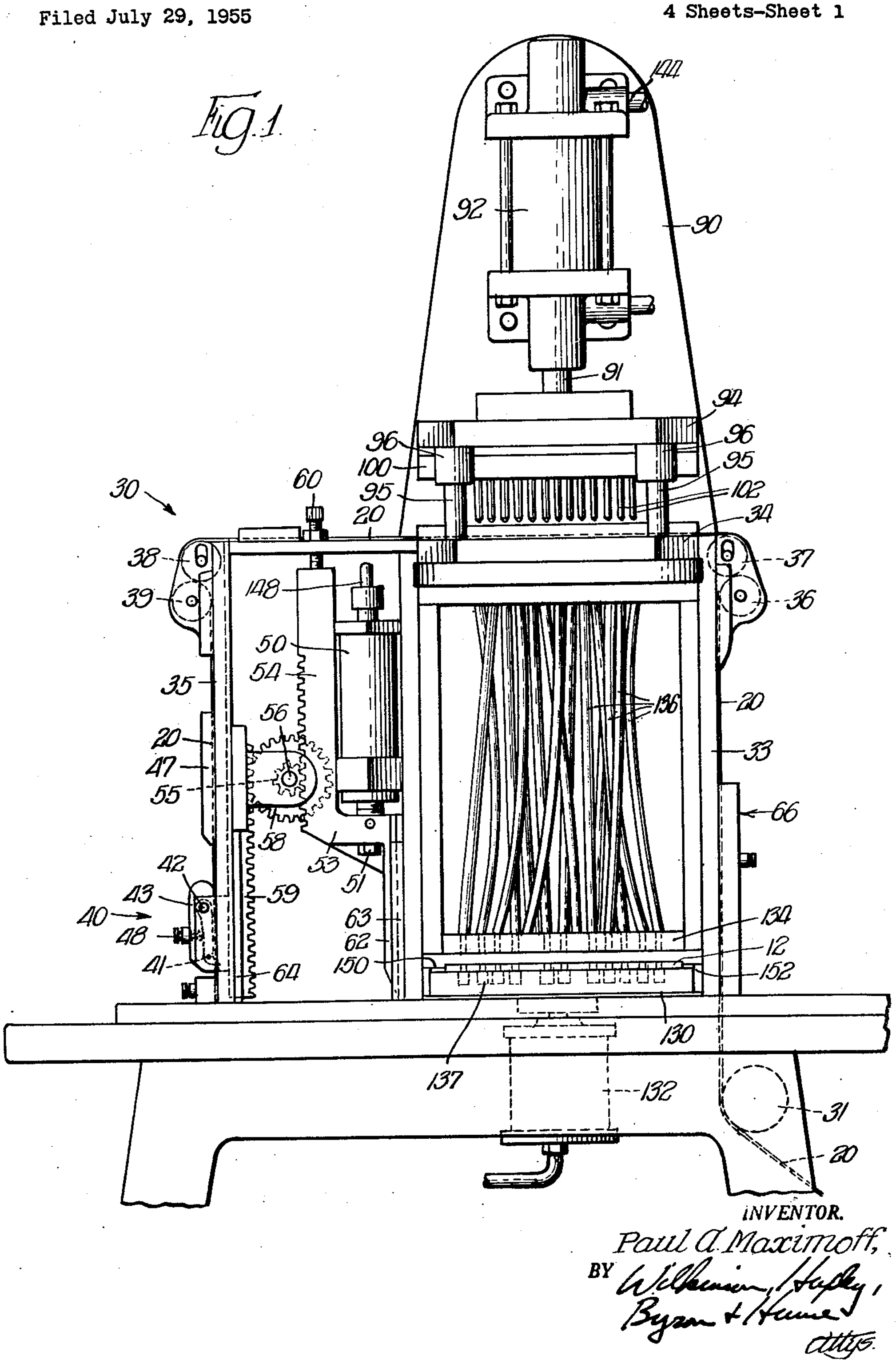
Figure 1 is a side elevational view of a machine embodying the present invention.

Referring now to Figures 1 and 2, there is illustrated a pin dispensing and mounting machine 30 embodying the invention. One or more flexible strips 20 carrying the integrally formed terminal pins are fed from suitable storage reels (not shown), each flexible strip passing under a roller 31 at the lower right hand corner of Figure 1 and upwardly along one vertical end wall 33 of the machine. Each flexible strip passes under the roller 36 and over the roller 37 and then passes onto the platform 34. While the flexible strips are in association with the horizontal platform 34 the pins are severed therefrom as will be later described. The flexible strips emerge from the exit side of the platform 34, without the pins, and pass between rollers 38, 39 and downwardly along the vertical end wall 35. Although two flexible strips are shown being fed through the mechanism illustrated in Figure 1, any suitable member can, of course, be used, depending upon the number of pins desired to be dispensed in each operation. As the flexible strips with the pins removed leave the dispensing apparatus, they may be fed into a cutting device to chop them into short segments so that they can be handled more readily as waste.

Figures 4, 5:
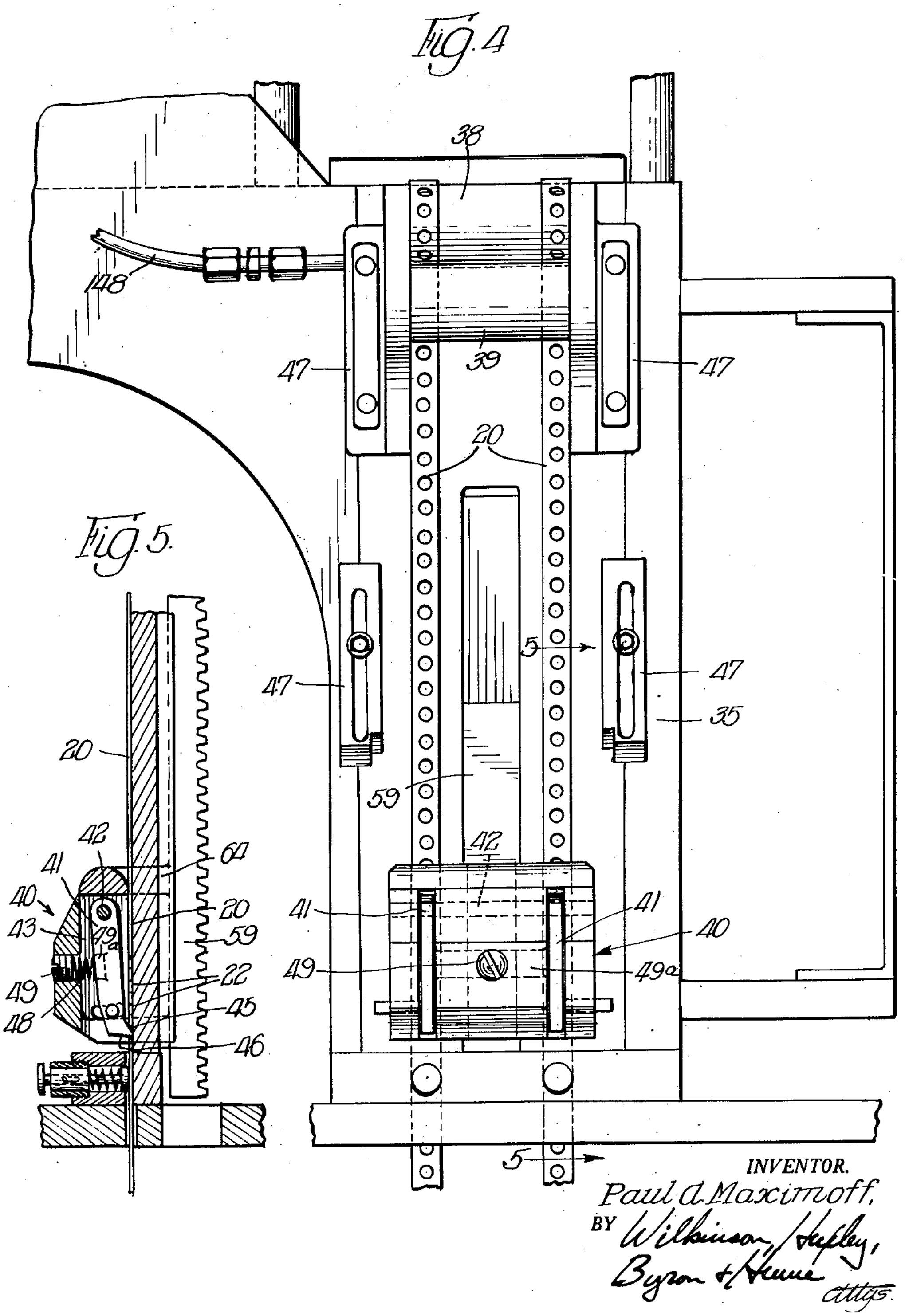
Figure 4 is a fragmentary end elevational view taken from the end opposite Figure 2.
Figure 5 is a view in section taken substantially along line 5—5 of Figure 4.

Referring now to Figures 1, 4 and 5, each flexible strip is intermittently advanced by a drive mechanism indicated generally by the numeral 40, located on vertical end wall 35. If two flexible strips are being fed through the device, this drive mechanism has a pair of pawls 41 pivoted on a pin 42 in the carriage 43 which is capable of vertical reciprocation along end wall 35. As shown in Figure 5, each pawl 41 has an inclined cam edge 45 and a flat edge 46 forming a nose which is adapted to be received in the holes 22 in the flexible strips 20. A spring 48, held in a recess closed by a screw 49 may be provided to bias the pawls toward flexible strip 20 by bearing against an arm **49*a* extending between and interconnecting the two pawls. As the carriage 43 is moved upwardly, each pawl 41 rides over the holes 22 of the flexible strip 20 because of the shape of cam edge 45 and does not engage the flexible strip. However, when the carriage 43 is moved downwardly, the flat edge 46 of the pawl 41 is adapted to engage the holes 22 in the flexible strip 20 to advance the flexible strip a preselected amount. This selection of the amount the flexible strip is advanced is made by disposing the cam elements 47 at a selected position along the end wall 35 so that the pawls 41 are dropped into engagement with the flexible strips 20 at the desired point in the downward stroke of the carriage 43. These cams 47** are best shown in Figure 4.

As best shown in Figure 1, the drive mechanism 40 may be vertically reciprocated by a rack and pinion operated by a pneumatic piston and cylinder arrangement. Double-acting cylinder 50 reciprocates a piston 51 fastened to an arm 53 of a rack 54. Rack 54 meshes with pinion 55, mounted on a shaft 56 to rotate pinion 58, also mounted on the shaft 56. Pinion 58 in turn meshes with rack 59 to which is mounted the carriage 43 of the drive mechanism, as best shown in Figure 5. An adjustable stop 60 may be provided to limit the upward travel of rack 54 in the form of a set screw. Attached to arm 53 on the rack 54 is a slide 62 adapted to be confined in a slideway 63. Similarly, rack 59 may be mounted for vertical movement in a slideway 64.

A brake member indicated generally by the numeral 66 may be mounted on vertical end wall 33 to restrain the movement of the flexible strips 20 as they enter the machine. As best shown in Figure 3, the brake may be mounted in a block 67 provided with recesses 68 for guiding the flexible strip carrying the terminal pins. In the form of brake shown, brake shoe 69 is mounted on a stud 70 and is biased and bears against each flexible strip 20 under the tension of a compression spring 71. A cylindrical mounting receptacle 72 is threadedly received in block 67. Receptacle 72 contains a threaded sleeve 73 which abuts and confines spring 71. The sleeve 73 is provided with longitudinal recess 74 through which projects a pin 75 fastened to stud 70. Thus, the tension of the brake shoe 69 against flexible strip 20 may be varied by rotating the knob 76 which moves stud 70 and pin 75 to turn sleeve 73 relative to the mounting 72. By moving sleeve 73 inwardly and outwardly, the tension of the spring 71 against brake shoe 69 is varied.

As shown in Figure 1, a side wall 90 at the top of the device supports a double-acting piston 91 and cylinder 92, which operate a punch associated with a die to be later described. As best shown in Figure 6, piston 91 has mounted thereon a plate 94 for reciprocation in a vertical plane toward and away from platform 34. Plate 94 is guided in its movements by four posts 95, which are mounted on the platform 34. Posts 95 are received in four bosses mounted to plate 94 and containing cylindrical openings 97 for receiving said posts. A block 100 is supported by plate 94 and depending from block 100 are aligning pins 102 and punches 103.

Referring now to Figures 6, 7, 8 and 9, a punch 103 is provided for cooperation with each flexible strip 20 of terminal pins which is fed through the device. In the form of device shown, there are two such flexible strips, and therefore two punches 103 are provided as clearly shown in Figure 6. These punches, as best shown in Figure 9, are elongated and adapted to operate simultaneously on a number of terminal pins and to first position and then remove pins from the flexible strip, as will be subsequently described. As best shown in Figure 9, each punch is provided with a ram portion 107 in the form of a rounded shoulder which is adapted to suitably position the terminal pins prior to the cutting operation. This positioning step is best shown in Figure 7, wherein a pin 16 is illustrated in the process of being bent downwardly from its initial position. Each punch 103 also has a plurality of aligning pins 102, as shown in Figure 6, which pins are adapted to be received in the openings 112 in the platform 34, and the die 110. These aligning pins 102 are likewise adapted to be received in the holes 22 in the flexible strip 20, so as to position the flexible strip accurately and to keep it in alignment with the chutes 114 in the platform 34, so that the pins 16 severed therefrom will fall directly into such chutes when they are severed from the flexible strip 20, as will later appear.

After the punch 107 has moved into the position shown in Figure 7, it continues to move downwardly until the shear plate 108, previously disposed above the pin 16, is brought into association therewith, and in cooperation with the cutting edge 109 of the die 110, severs the pin 16 cleanly from the perforated strip portion of the flexible strip 20, as best shown in Figure 8. As shown in Figure 9, shear plates 108 are shorter than the ram 107 and are mounted on the side of the ram adjacent the cutting edge 109 of the die 110. A shear plate is provided for each pin 16 and all of the pins which have been fed into the machine can be severed simultaneously from the flexible strip 20 in one stroke of the punch 103.

As previously mentioned, a flexible strip guide 116 is provided in association with the platform 34 having recesses 118 therein through which the flexible strips 20 can be moved longitudinally with the pins 116 projecting outwardly into suitable openings 120 into which the punch 103 is inserted during the positioning and cutting operation previously described. As has already been described, the number of pins which are moved into association with the punch 107 in each cycle of the operation of the machine is previously determined by a selected positioning of the cam members 47, which in turn control the operation of the pawls 41 in the carriage 40.

For example, if the mechanism is designed to receive a maximum of 20 pins from each flexible strip 20, it would be possible to set the cams 47 so that 20 pins are moved into operative association with the punch 107 in each operation of the mechanism. Since the cams 47 which control the operation of the pawls 41 in the carriage 40 can be set at any desired point in such an instance, anywhere from one to 20 pins could be dispensed from each flexible strip 20. This would, of course, means that the total number of pins dispensed by the machine could be from two to 40. In such a case, there would be 20 shear plates 108 in each of the two punches 103 and there would also be a total of 40 chutes 114 provided in the platform 34 into which severed pins will drop.

After the selected number of pins have been moved into association with the punches 103 and the positioning and cutting process previously described and illustrated in Figures 7 and 8 have been carried out, the pins drop into the chutes 114 and are carried by gravity downwardly into the flexible guide tubes 136. These tubes are associated with the bottom openings in the chutes 114, at one end, and have their other ends inserted in suitable openings provided in the template 134, as best shown in Figure 1. As previously indicated, this template 134 may have any desired pattern of apertures formed therein, corresponding to the openings or holes in the base board 12 into which the terminal pins are to be inserted.

Normally the device will be used to insert terminal pins in one design of base board and circuit over a substantial period of time, but one of the advantages of the present invention is that variations in the pattern of dispensing can be very readily accomplished. This can be done by substituting a new template with a different pattern of openings therein for the template 134. Likewise, it is possible to vary the pattern using the same template, by merely changing the position of the lower ends of the tubes 136 so that they are inserted into the selected openings in the template. Coupled with this is the fact that the number of pins dispensed in any one operation can be controlled, as previously indicated, by the adjustment of the feeding device 40 which draws a measured amount of flexible strip through the machine in each cycle of operations.

In any event, the flexible guide tubes 136 are normally disposed so as to extend between the chutes 114 and a selected pattern of apertures in the template 134, in accordance with the number and position of the pins desired to be inserted in the printed circuit board. Thus, as the pins are severed from the flexible strip 20 on the platform 34, they fall by force of gravity into the chutes 114 and are directed by the flexible guide tubes 136 to the preselected apertures in template 134, passing therethrough and into the proper holes in the base board 12. As shown in Figure 1, the base board is normally supported on a table 130 immediately below the template 134, which table may be raised and lowered by a pneumatic piston and cylinder arrangement 132. The table 130 may be provided with a plurality of slots 137 and the various openings in the base board of the printed circuit in which terminal pins are to be inserted will normally be aligned with the slots. The purpose of the slots 137 is to permit the nose of the terminal pins to extend down through the base board 12 as the pins are inserted in the openings therein. In place of the slots, it is possible that the table 12 could have a second template on it comparable to the template 134, although the problems of aligning the base board with such a template would be greater than is demanded by a table having longitudinal slots therein.

The cycle of operations of the device may be carried out by pneumatic controls, as previously indicated. The first step, of course, is to have the feeding mechanism 40 draw a selected length of flexible strip into association with the punches 103. The motion of the flexible strips 20 is then interrupted by suitable valve arrangements, and at the same time, the piston and cylinder combination 132 is activated to lift the table 130, having a base board 12 disposed thereon, into association with the template 134, as previously described. As shown in Figure 2, a pneumatic switch 138 may be provided in association with the template 134, which is adapted to be activated by the platen or table 130 as it brings the base board into association with the template 134. This switch 138 is connected in turn to the control box 140 through the conduit 142. The cylinder 92 at the top of the mechanism is connected by the conduit 144 to the control box 140 and is so arranged that when the switch 138 is closed, the cylinder 92 and the piston 91 are actuated so as to cause the punches 103 to move downwardly, as previously described, to sever the pins from the chains 20.

Suitable pneumatic connections may be provided to cause the piston 91 to be moved upwardly after the cutting operation is completed. A second pneumatic switch 146 may be disposed in association with the platen or table 130 so as to be activated when the table returns to the normal position. This switch 146 can be used to control the feeding of the flexible strips 20 and the activation of the air cylinder 50 through the conduit 148, shown in Figures 1 and 4. This pneumatic system therefore permits the successive operation of the various steps previously described in the cycle of dispensing and setting of one set of terminal pins in each base board.

Any suitable form of feeding the base boards 12 can be utilized and a method of aligning them will, of course, be necessary. As shown in Figure 1, the table 130 is provided with marginal shoulders 150 and 152, which aid in laterally aligning the base board as it moves through the device. Obviously, a suitable stop mechanism should be provided for momentarily aligning the base board in the direction of its movement for the dispensing operation.

It may also be desirable to provide a second unit immediately adjacent the unit just described for firmly setting the pins after they have been placed in the proper holes in the base board. Such a unit may consist primarily of a platen capable of applying pressure to the upper ends of the pins projecting from the base board 12. If the form of pin shown in Figure 11, for example, is being dispensed, such a platen could apply suitable pressure to each pin in one operation in order to insure that the pin was completely inserted in the base board and to bring the bosses 21 into operative association with the under side of the board. Such a platen may be provided with a plurality of countersunk openings disposed in the pattern of the dispensed pins. The heads of the dispensed pins will be moved into vertical alignment as they are received in these countersunk openings and then pressed firmly downward to insure that they are properly seated and locked in the base board.

In some instances, it may also be desirable to provide a clinching unit to lock each pin in place by upsetting the portions extending through the openings in the base board, after they have been seated, as described.

It may thus be seen that the invention provides a ready means of dispensing and positioning terminal pins or the like in the base board of a printed circuit. A maximum amount of flexibility is also provided in both the number of pins dispensed and the actual pattern in which they are placed in the base board. The device readily lends itself to being incorporated into an automation line and is capable of saving many man-hours in the assembly of electronic devices and the like.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

I claim:

1. A device for dispensing and mounting a plurality of pins in a base member comprising a support for said member, means for advancing a flexible strip carrying a plurality of pins to a position above said support, a die member having a cutting edge, a movable block member, a shear member mounted on said block member for severing the pins from said flexible strip in cooperation with the cutting edge of said die member, alignment members carried by said block member and engageable with said flexible strip independent of said pins for prepositioning said strip and said pins before the pins are severed, and guide members for separately directing the pins after they are thus severed and as they fall by force of gravity to a preselected pattern of arrangement in said base member.

2. A device for dispensing and mounting a plurality of pins or the like in a base member comprising a support for said base member, means for advancing a flexible strip carrying a plurality of pins to a position above said support, means for bending the pins relative to said strip, means for severing the pins from said strip, and means for directing the severed pins in a preselected pattern to said base member.

3. A device for dispensing and mounting a plurality of pins or the like in a base member, comprising a support for said base member, means for advancing a flexible strip carrying a plurality of pins to a position above said support, means for bending the pins relative to said strip, means for severing the pins from said strip and guide members for separately directing the pins after they are thus severed and as they fall by force of gravity to a preselected pattern of arrangement in said base member.

4. A device for dispensing and mounting a plurality of pins in a base board of a printed circuit from a flexible ribbon carrying along one edge thereof a plurality of pins, said device comprising a table for supporting the base board, a platform positioned above said table, a plurality of chutes in said platform, guide members mounted on said platform for positioning said ribbon on the platform with the pins above said chutes, means for advancing said ribbon to locate a single pin over each of said chutes, a die member having a cutting edge, a movable block member, a shear member mounted on said block member for severing the pins from said ribbon in cooperation with the cutting edge of said die member, alignment members carried by said block and engageable with said ribbon independent of said pins for prepositioning said ribbon and said pins before the pins are severed, and guide members for separately directing the pins after they are thus severed and as they fall by force of gravity into a preselected pattern of arrangement in said base board.

5. A device for dispensing and mounting a plurality of pins in a base board of a printed circuit from a flexible ribbon carrying along one edge thereof a plurality of pins, said device comprising a table for supporting the base board, a platform positioned above said table, a plurality of chutes disposed in a straight line in said platform, means for advancing said ribbon, guide members mounted on said platform for positioning said ribbon adjacent to and the pins above said chutes, a die member having a cutting edge, a movable block member, a shear member mounted on said block member for severing the pins from said ribbon in cooperation with the cutting edge of said die member, a punch member mounted on said block member and including a ram portion for bending said pins relative to said ribbon and a shear portion for severing the pins from said ribbon in cooperation with the cutting edge of said die member, and guide members for separately directing the pins after they are thus severed and as they fall by force of gravity into a preselected pattern of arrangement in said base board.

6. A device for dispensing and mounting a plurality of pins in a base board of a printed circuit from a flexible strip carrying along one edge thereof a plurality of pins, said device comprising a table for supporting the base board, a platform positioned above said table, a plurality of chutes in said platform, means for advancing said flexible strip carrying a plurality of pins to said platform, flexible strip guides mounted on said platform for positioning the pins above said chutes, a die member having a cutting edge, a movable block member, a shear member mounted on said block member for severing the pins from said flexible strip in cooperation with the cutting edge of said die member, alignment members carried by said block member to align said flexible strip, a punch member mounted on said block member and including a ram portion for bending said pins relative to said strip and a shear portion for severing the pins from said strip in cooperation with the cutting edge of said die member, and guide members for separately directing the pins after they are thus severed and as they fall by force of gravity into a preselected pattern of arrangement in said base board.

7. A device for dispensing and mounting a plurality of pins in a base board of a printed circuit from a flexible strip carrying along one edge thereof a plurality of pins, said device comprising a table for supporting the base board, a platform positioned above said table having an entrance edge and an exit edge, a plurality of chutes in said platform disposed between said entrance and exit edges, flexible strip guides mounted on said platform for conducting the flexible strip along the surface of the platform and for positioning the pins above said chutes, means for intermittently advancing the flexible strip from said entrance edge to said exit edge of said platform, a die member having a cutting edge, a movable block member, alignment members carried by said block member to align said flexible strip, a punch member mounted on said block member and including a ram portion for bending said pins relative to said strip and a shear portion for severing the pins from said strip in cooperation with the cutting edge of said die member, and a plurality of guide members communicating with said chutes for directing the pins after they are thus severed and as they fall by force of gravity into a preselected pattern of arrangement in said base board.

8. A device for dispensing and mounting a plurality of pins in the base board of a printed circuit provided with holes for mounting said pins, said device comprising a table adapted to support said base board, a template above said table, said template having a plurality of apertures corresponding to the holes in the base board, means for raising said table to position the base board adjacent said template, a platform located at a point above said template, guide tubes extending from said platform to said template apertures for directing the pins to the holes in the base board, means for advancing a flexible strip carrying a plurality of pins to said platform, means for bending a selected number of said pins relative to said strip, and means for severing said selected number of said pins from said flexible strip so that they fall by gravity to said guide tubes into a preselected pattern of arrangement in said base board.

9. A device for dispensing and mounting a plurality of pins in the base board of a printed circuit provided with holes for mounting said pins, said device comprising a table adapted to support said base board, a template above said table, said template having a plurality of apertures corresponding to the holes in the base board, means for raising said table to position the base board adjacent said template, a platform located at a point above said template, guide tubes extending from said platform to said template apertures for directing the pins to the holes in the base board, means for feeding a preselected length of a flexible strip of material having a plurality of pins integrally formed therewith into association with said platform, means for aligning said pins associated with said strip with said guide tubes, means for bending said aligned pins relative to said strip, and means for severing said aligned pins from said strip so that they drop by gravity to said guide tubes into a preselected pattern of arrangement in said base board.

10. A device for dispensing and mounting a plurality of pins in a base member comprising a support for said base member, means for advancing a flexible strip carrying a plurality of pins to a position above said support, a movable punch member having a ram portion for bending said pins relative to said strip and a shear portion for severing the pins from said strip, and means for directing the pins in a preselected pattern to said base member.

11. A device for dispensing and mounting a plurality of pins in a base member comprising a support for said base member, means for advancing a flexible strip carrying a plurality of pins to a position above said support, a movable punch member having a ram portion with a rounded shoulder for engaging said pins to bend the pins relative to said strip, said punch member having a shear portion for severing the pins from said strip after they are bent, and means for directing the pins in a preselected pattern to said base member.

12. A device for dispensing and mounting a plurality of pins in a base member comprising a support for said base member, feed means for advancing a flexible strip carrying a plurality of pins to a position above said support, means for severing said pins from said strip, said feed means including mechanism engaging said strip beyond said severing means to pull said strip for placing additional pins in position for severing, and means for directing the severed pins in a preselected pattern to said base member.

13. A device for dispensing and mounting a plurality of pins in a base board of a printed circuit from a flexible ribbon carrying along one edge thereof a plurality of pins, said device comprising a table for supporting the base board, a platform positioned above said table, a plurality of chutes in said platform, guide means on said platform for positioning said ribbon on the platform with the pins above said chutes, feed means for advancing said ribbon to locate a single pin over each of said chutes, means for severing said pins from said ribbon, said feed means including mechanism engaging said ribbon beyond said severing means to pull said ribbon for placing additional pins over said chutes after the previously located pins have been severed, and guide members for separately directing the pins after they are thus severed and as they fall by force of gravity into a preselected pattern of arrangement in said base board.

References Cited in the file of this patent

UNITED STATES PATENTS

| | | |
|---|---|---|
| 356,553 | Raymond, 2d | Jan. 25, 1887 |
| 375,913 | Allen | Jan. 3, 1888 |
| 383,911 | Raymond, 2d | June 5, 1888 |
| 410,676 | Raymond, 2d | Sept. 10, 1889 |